United States Patent [19]

Van Buskirk

[11] 3,867,629
[45] Feb. 18, 1975

[54] SYSTEM FOR MEASURING ROTATION USING POLARIZED LIGHT

[75] Inventor: Lyman F. Van Buskirk, Ridgecrest, Calif.

[73] Assignee: The United States of America as represented by the Secretary of the Navy, Washington, D.C.

[22] Filed: May 28, 1974

[21] Appl. No.: 473,969

[52] U.S. Cl................ 250/225, 250/236, 250/209, 356/114
[51] Int. Cl.............................................. G02f 1/18
[58] Field of Search .......... 250/225, 216, 234, 236, 250/231 SE, 209, 208; 356/114, 141; 350/147; 235/92 V

[56] References Cited
UNITED STATES PATENTS

| | | |
|---|---|---|
| 3,375,375 | 3/1968 | Abbey et al. .................. 250/209 X |
| 3,584,959 | 6/1971 | Del Carlo ..................... 250/231 SE |
| 3,612,695 | 10/1971 | Bouwhuis et al. ................. 356/114 |
| 3,998,746 | 9/1961 | Gievers .......................... 250/225 X |

Primary Examiner—Walter Stolwein
Attorney, Agent, or Firm—R. S. Sciascia; Roy Miller; Robert W. Adams

[57] ABSTRACT

A system for sensing the rotational orientation of an object such as a pilot's helmet wherein a polarized surface backed by a reflective coating is mounted on the object and illuminated by a rotating, polarized laser beam. The beginning rotational position of the beam, and its position when its polarization matches the polarization of the object-mounted polarizer, are measured by an incremental digital encoder to determine the object's orientation.

9 Claims, 3 Drawing Figures

SYSTEM FOR MEASURING ROTATION USING POLARIZED LIGHT

BACKGROUND OF THE INVENTION

In the field of remote sensing devices, the previous means for measuring an object's orientation, such as the orientation of a pilot's helmet in order to determine the pilot's line-of-sight, have primarily been mechanical linkages. Within recent years at least one optical system, U.S. Pat. No. 3,678,283 by Kenneth B. LaBaw, entitled "Optical Helmet Tracker," has been developed which eliminates the mechanical linkages previously required. All, however, attempt to measure the pilot's line-of-sight regardless of the helmet's position within, and only within, the imaginary head-motion box usually occupied by the pilot's head. None utilize polarizers.

SUMMARY OF THE INVENTION

The present invention is a device for measuring an object's rotation, including a source of rotating polarized light, a polarizer in covering relationship to a reflective surface and attached to the object for rotation therewith, and a photodetector for sensing the light reflected by said reflective surface. A counter is started at a reference point in the rotation of said rotating polarized light, and then counts the increments of rotation of the light until the counter is stopped when light is sensed by said photodetector. Since light is sensed only when the object mounted is aligned with the polarized light, and the amount of rotation of the polarized light from a reference is known, the object's rotation can be measured.

DESCRIPTION OF THE PREFERRED EMBODIMENT

Figures 1, 2, 3:
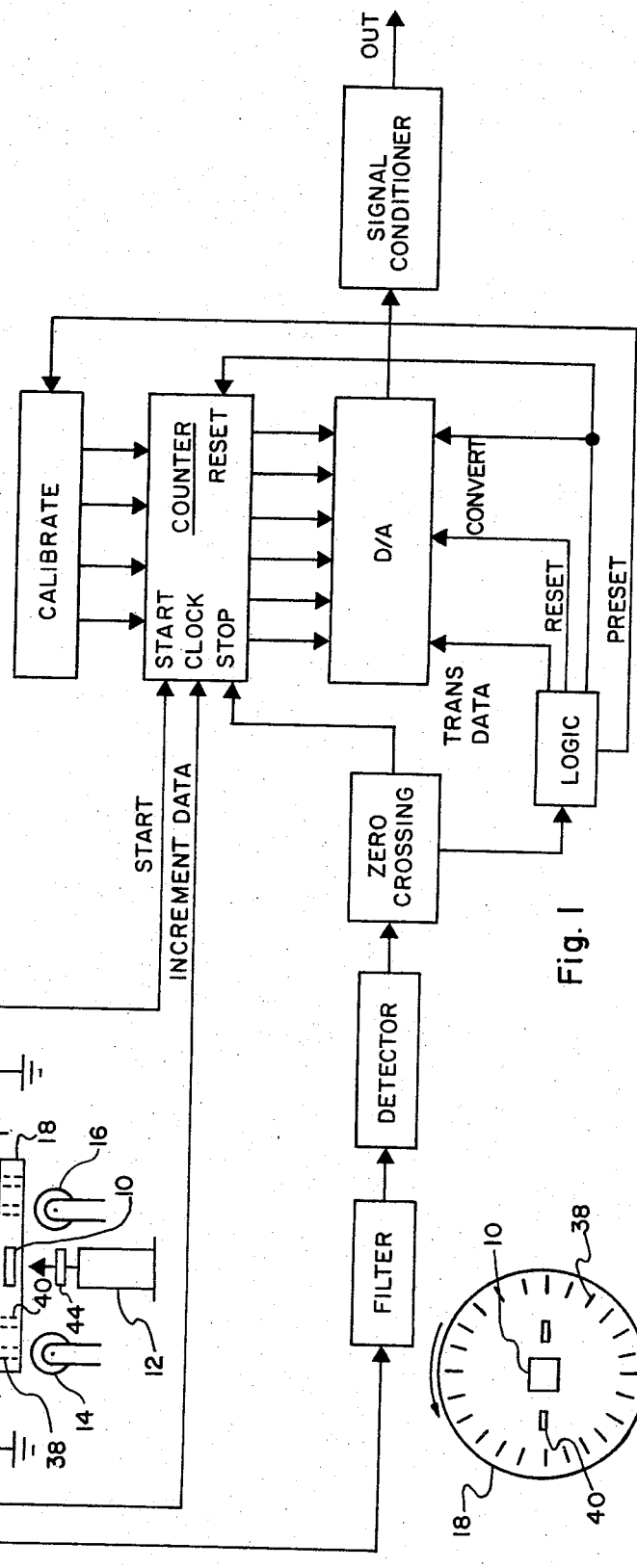
FIG. 1 is a schematic diagram, partially in plan view, of the preferred embodiment of the present invention.
FIG. 2 is a plan view of the digital encoder disc of the preferred embodiment of the present invention; and, FIG. 3 is an example of a sinusoidal waveform which may be provided as the output of photodetector 36 by the preferred embodiment of the present invention, after filtering but before squaring.

FIG. 1 shows a plan view of the optics and mechanics, and a block diagram of the associated electronics, of the preferred embodiment of the present invention which utilizes polarizer techniques and measures the rotation in which two polarizers come into alignment. Quarter-wave plate 10, shown in FIG. 1 and FIG. 2, fixedly attached to digital encoder disc 18, is positioned in alignment with the output of laser 12. The laser's output is linearly polarized light, converted to circularly polarized light by quarter wave-plate 44, and rotated by quarter-wave plate 10 to provide a beam 32 having polarization characteristics indicative of the degree of rotation of disc 18 from a known reference.

Disc 18, shown in FIGS. 1 and 2, contains a first set of annular perforations 38 aligned with light source 14 and photodetector 20; and, a second set of perforations 40 aligned with light source 16 and photodetector 22. Perforations 40, whether they be radially inside, or outside of perforations 38 are used to initiate, or start, the counter of the associated electronic package. Once initiated, the counter then counts the pulses it receives from photodetector 20 before it receives a stop order from a second photodetector 36, which will be discussed later. The number of pulses provided by photodetector 20 is equal to the number of perforations 38 that have been rotated past illumination source 14. Thereby, the amount of rotation of disc 18 from its known reference position is measured accurately. The degree of accuracy of the measurement will depend upon the spacing between the perforations 38 and their transmission resolution. That is, the more perforations there are per degree around the periphery of the disc, the greater the accuracy of the measurement will be, assuming photodetector 20 is adequately shuttered between perforations to provide distinct pulses to the clock. The photodetectors employed in the present invention are preferably annular photodetectors for maximum sensitivity.

Rotated, polarized beam 32 is directed by reflective surface 24 toward helmet 30. Helmet 30 includes polarizer 26 and reflective material 28, mounted for movement with the helmet. Material 28 is preferably "Scotch Lite" reflective material. Reflective surface 24 is convex to diverge beam 32 onto a larger area of material 28.

When the rotational position of disc 18 corresponds to the rotational position of helmet 30 about axis 42, the polarization of beam 32 matches the polarization of polarizer 26, and the beam is transmitted through the polarizer with minimum attenuation, reflected by reflective material 28, and detected by photodetector 36. And, for all other positions of rotation about axis 42, polarizer 26 attenuates the polarized beam 32, reducing the light intensity on the photodetector 36. Regardless of the rotational position of helmet 30, however, there will be a corresponding rotational position of disc 18 that will result in a polarization-matching beam 32 that will be reflected to photodetector 36.

The output of photodetector 36 is filtered, squared, and leading edge detected to provide a stop order for the counter. The electronic package shown in block diagram form is an example of circuitry that may be employed to process the photodetector pulses and provide a meaningful output. The blocks shown find common usage in the digital electronics field, and will not be further discussed here except to describe the packages' general purpose. When triggered by the "start" pulse from photodetector 22, the counter digitally counts each pulse received as "incremental data" from photodetector 20 until it receives a "stop" order responsive to the output of photodetector 36. The D/A is a digital-to-analog converter for converting the digital information in the form of a plurality of individual electrical charges to an analog output, which output represents the angle turned from zero alignment. A spectral filter limits light incident on the photodetector to that of the color of the illuminator. An electronic filter further limits the photodetector output signal to be sensitive only to a modulation frequency equal to one impressed on the illuminator of about 10 KHZ, further reducing noise. This signal is detected and filtered at the polarization frequency, squared and used to trigger a pulse generator, effecting a consistant stop pulse for the counter.

The D/A converter used is of the type that outputs a plus or minus DC voltage proportional to the digital count away from one-half full-count; that is, at one-half full-count, the output is zero, and any deviation from this point will generate a voltage proportional to the deviation. Plus 5 volts is generated when the helmet is turned up 90° and minus 5 volts is generated when the helmet is turned down 90°.

The operation of the present invention is as follows: Perforated disc 18 is made to rotate. Laser 12 emits linearly polarized light which is converted to circularly polarized light by quarter-wave plate 44, which is converted back to linearly polarized light by quarter-wave plate 10 rotated with encoded disc 18. When first slot or perforation 40 comes into alignment with illumination source 16 and photodetector 22, photodetector 22 senses the light from source 16 and starts the counter. As disc 18 continues to rotate, the counter counts the increments, i.e., the perforations or slots 38 which pass, and are sensed by, photodetector 20. Simultaneously, and at the same rate, the rotational angle of polarization of light 32 from illumination source 12 is changing. At the point of rotation of disc 18 when polarizer 10 is in rotational alignment with polarizer 26 mounted on the side of object 30, light 32 will be maximized through polarizer 26, be reflected by reflective material 28 pass back through polarizer 26 and be detected by photodetector 36. Photodetector 36, in response to the light received, provides a sinusoidal electrial signal, that when squared, is used to generate a stop pulse to stop the counter. As a result, the counter has counted the rotational increments which disc 18 has moved from a reference position to align polarizer 10 with polarizer 26. Assuming the orientation of polarizer 26 with object 30, and with the start position of disc 18, is known, the orientation of polarizer 26, and thereby the orientation of object 30, around axis 42 can be directly read out of the system. The previous assumption will be valid when care is taken in precisely generating the "clock pulse" pattern (38) and the system is set up sufficiently accurately to complete the light path.

If object 30 is an operator's helmet, a helmet mounted sight, such as the "Holographic Sight" disclosed by Reed A. Farrar in U.S. Pat. No. 3,633,988, may be used to extend the application of the present invention to measure the operator's line-of-sight. That is, if the pilot's line-of-sight has a known relationship with the orientation of the helmet, the line-of-sight can be measured by the present invention.

Some of the advantages of the present invention are that it is simple, inexpensive, and has only one moving part. Also, the object's weight and volume is increased only slightly, which is of primary importance if the object is an aircraft pilot's helmet. Additionally, there are no active elements attached to the object, only a polarizer and reflective material are mounted thereon.

What is claimed is:

1. A system for measuring the rotational orientation of an object by comparing its orientation with a known reference, comprising:

an object;

a reflector backed polarizer attached to said object for rotation therewith;

a source of linearly polarized light illuminating said polarizer wherein the polarization of said light rotationally varies at a constant rate, including an illumination source a rotatable quarter wave-plate in the path of said light and means for rotating said quarter wave-plate;

means for measuring the rotational orientation of said polarized light;

means for directing said polarized light onto said reflector backed polarizer; and means for detecting the polarized light reflected by said reflector backed polarizer;

wherein the polarized light is reflected and detected by said detecting means when the rotational orientation of the linearly polarized light matches the rotational orientation of the object.

2. The system of claim 1 wherein said means for rotating said quarter wave-plate is a rotatable disc to which said wave-plate is fixedly attached, and said rotational orientation measuring means includes said rotatable disc having a plurality of rows of circumferentially spaced perforations, at least one light source and photodetector pair in alignment with each row of perforations, and an electronic counter, wherein the operation of said counter is initiated by the output of one of said at least one photodetector in alignment with one of said rows of perforations, and thereafter the perforations passing one of said at least one photodetector in alignment with another row of perforations are counted by said counter.

3. The system of claim 2 wherein said detecting means includes a photodetector in alignment with the beam reflected by said reflector backed polarizer, providing an output in response to detection of said beam, which output is coupled to said counter for discontinuing said counting.

4. The system of claim 3 wherein said reflector backed polarizer is an optical polarizer backed by reflective material.

5. The system of claim 4 wherein an electronic digital-to-analog converter is coupled to said counter for converting the output of said counter into an analog readout of the rotational orientation of said disc when said counting is discontinued, and thereby, the orientation of the object is read out.

6. The system of claim 5 having first and second rows of said circumferentially spaced perforations, and said first row comprises two radially opposed perforations, and each row has one light source-photodetector pair in alignment therewith.

7. The system of claim 6 wherein the output of the photodetector in alignment with said first row initiates said counter.

8. The system of claim 7 wherein said illumination source of said linearly polarized light is a laser, and the output of said laser is converted to a circularly polarized beam by a first quarter wave-plate and rotated to a linearly polarized beam by said rotatable quarter wave-plate.

9. The system of claim 7 wherein said object is a pilot's helmet and said reflector backed polarizer is mounted on one side thereof such that the rotational orientation of the pilot's head is measured.

* * * * *